United States Patent [19]

Yueh et al.

[11] 4,151,307

[45] Apr. 24, 1979

[54] PROCESS FOR PRODUCING A FRIED SNACK FOOD CONTAINING TEMPEH

[75] Inventors: Mao H. Yueh, Minneapolis; George V. Daravingas, Edina; Fred J. Rigelhof, Minnetonka; Herman W. Mueller, Minneapolis, all of Minn.

[73] Assignee: General Mills, Inc., Minneapolis, Minn.

[21] Appl. No.: 528,601

[22] Filed: Dec. 2, 1974

[51] Int. Cl.² ............................................. A23L 1/01
[52] U.S. Cl. .................................... 426/549; 426/440; 426/550; 426/559; 426/808
[58] Field of Search ............... 426/152, 343, 346, 347, 426/141, 46, 550, 615, 621, 625, 439, 808, 559, 440, 549

[56] References Cited

U.S. PATENT DOCUMENTS

| | | | |
|---|---|---|---|
| 3,243,302 | 3/1966 | Hesseltine et al. | 426/18 |
| 3,539,356 | 11/1970 | Benson et al | 426/550 |
| 3,681,085 | 8/1972 | Gyorgy | 426/46 |
| 3,753,735 | 8/1973 | Gerkens | 426/550 |
| 3,849,582 | 11/1974 | Blagdon | 426/372 X |

*Primary Examiner*—Raymond N. Jones
*Assistant Examiner*—Elizabeth A. Hatcher
*Attorney, Agent, or Firm*—Gene O. Enockson; L. MeRoy Lillehaugen

[57] ABSTRACT

A fried, starch containing snack product is produced wherein tempeh is included as an essential ingredient.

1 Claim, No Drawings

PROCESS FOR PRODUCING A FRIED SNACK FOOD CONTAINING TEMPEH

The present invention relates to a new snack product and the process of preparing same. More particularly, it relates to such a snack item having an increased protein content wherein tempeh is used as an essential ingredient thereof.

Tempeh, a fermented soybean preparation, has been used for centuries as a valuable and important food product in the Far East, especially Indonesia. Various methods are known for its preparation including those described in U.S. Pat. Nos. 3,228,773; 3,489,570; and 3,681,085, for example. In the ordinary situation, the tempeh may be thinly sliced, dipped in salt water, deep-fat fried, and promptly consumed. If the tempeh is to be preserved, the raw cake may be sliced and then boiled to destroy the mold or fungi. The boiled tempeh may be frozen and kept until it is ready to be cooked.

Likewise, cereal based snacks are well known products in the United States and other countries. Perhaps the best known of these are the various forms of potato chips (or crisps as they are referred to in some countries such as Great Britain). Due to their pleasing texture and taste, the cereal based snacks have wide appeal to a broad spectrum of the public. However, it would be desirable to increase the protein content and reduce the fat content thereof without significantly reducing the appeal that these various shaped products have with the consuming public.

Accordingly, we have now found new snack products which combine the relatively high nutritional characteristics of tempeh with the texture and flavor appeal of cereal based snack items. At the same time, the fat content of the fried snacks can be significantly reduced. More particularly, our invention relates to a starch containing fried snack wherein the improvement comprises increasing the protein content by including a protein increasing amount of tempeh therein.

The cereal component used may be any of the commonly employed starch containing materials used in fried snack manufacture. Thus wheat flour, potato flour (including flakes and granules), corn meal and flour, wheat starch, potato starch, corn starch and the like may be used as the cereal component in the new snack products of the invention. Various combinations of the cereal materials can be used and it is also advantageous that some pregelatinized starch be included. The latter tends to aid in the puffing of the snack item on deep fat frying.

The cereal material and tempeh are mixed to form a shapable dough which is then formed into the desired shaped product prior to being fried. Mixing and shaping can be carried out in conventional mixers, extruders, cutters, etc. The products may take the form of chips, ribbons and so-forth.

As indicated, the tempeh is used in an amount sufficient to increase the protein content of the fried starch containing chip. Generally the amount of tempeh used in the dough preparation will be from about 5 to 60 percent by weight based on the weight of the dough. Preferably, however, the tempeh will be used in amounts less than about 50 percent since above that amount the tempeh starts to inhibit expansion of snack product upon being deep fat fried. Tempeh (fresh, frozen and/or autoclaved) generally contains approximately 60-62% water, 20% protein, 8% oil and 10% carbohydrates with a minor amount of ash. Thus on a dry weight basis, the tempeh would be used in an amount of about 2 to 25% by weight. The shapable dough preferably contains from about 18 to 55% water. After shaping, the water content is preferably reduced by air drying or the like to a range of about 5 to 12%.

Minor ingredients can be used in their usual amounts in the preparation of the fried snacks of the present invention. Thus various flavorings (including salt), colorings and the like can be added if desired. Likewise, the flavorings, colorings and the like can be added to the already formed and fried snack.

As indicated, the shaped dough is fried in hot oil or fat using conventional techniques, such as frying items of about 6 to 15 seconds at oil or fat temperatures of about 325° to 375° F. Upon frying, the snack expands or puffs to a significant degree and preferably in an amount of about 2 to 8 times. The finished snacks are crisp or friable with increased protein contents and reduced fat contents over similar chips made without the tempeh.

The following examples serve to illustrate certain preferred embodiments of the invention without being limiting. Unless otherwise indicated, all parts and percentages are by weight.

EXAMPLE I

Washed soybean splits (2.0 Kg.) were soaked in a 1.0% citric acid solution (4.0 l.) for approximately 16 hours and then boiled for one hour after an additional 6.0 l. of water was added. The beans were then drained, rinsed with distilled water, inoculated with *Rhizopus Oligosporus* NRRL 2710 and packed into perforated plastic bags (approximately 1.5 in. × 5.0 in.). Fermentation was carried out for 18–24 hours at 35° C. to yield the product commonly known as tempeh. The tempeh was sterilized in an autoclave at 15 psi. for 20 minutes. After cooling, it was ground and blended with other ingredients in the following amounts: ground tempeh 44.0%; ground potato flakes 44.0%; pregelatinized waxy maize starch (Polar Gel I) 8.5%; and NaCl 3.5%. This mix was then extruded in a Brabender extruder using a 1:1 screw, a feed rate of 20 rpm., temperatures in zones 1 and 2 of 90° C. and 95° C., respectively, and heating of a 0.020 inch die to 100° C. The resulting thin strips of dough were cut into chip sizes (approximately 1 × 1¼ inches) and allowed to air dry overnight to a moisture content of about 9%. This dry product (half product) was then deep fat fried in coconut oil at 375° F. for 6½ seconds and excess oil was drained off. The resulting fried chips had good texture and flavor and were expanded about 3 times. They had a protein content of 11.5% and a fat content of 25.4% as compared to 5.3% protein and 39.8% fat in a typical commercial potato chip product.

EXAMPLE II

Example I was essentially repeated except using the following ingredients:

|  | % by weight |
| --- | --- |
| Ground tempeh | 44.0 |
| Ground potato flakes | 39.0 |
| Pregelatinized starch (as in Example I) | 8.5 |
| NaCl | 3.5 |
| Gluten (Pro 80) | 5.0 |

The final product was very similar to the product of Example I except with slightly less puff. It had a protein content of 16.4% and a fat content of 21.0%.

Similar results to the above examples were obtained using fresh tempeh instead of sterilized tempeh, potato starch instead of pregelatinized waxy maize starch (the products had somewhat less puff and a tougher texture), and/or frying temperatures of 350° F. and times of 7 seconds. Flavored products were also obtained by enrobing the chips with flavorings such as bacon, sour cream and green onion, barbecue and/or cheese.

The embodiments of the invention in which an exclusive property or privilege is claimed are defined as follows:

1. In the process of preparing a fried snack product wherein a dough is prepared from a starch containing material selected from cereal flour, cereal starch, potato flour, potato starch and mixtures thereof wherein a portion of said starch containing material is a pregelatinized starch, the dough is shaped and then the shaped piece is deep fat fried, the improvement consisting of including tempeh in the dough in an amount of about 5 to 60% by weight based on the weight of the dough.

* * * * *